US012763354B2

(12) United States Patent
Parrish et al.

(10) Patent No.: US 12,763,354 B2
(45) Date of Patent: Oct. 13, 2026

(54) MANUFACTURING SYSTEMS AND METHODS FOR OPTIMIZED CURING OF STRUCTURAL ADHESIVE MATERIALS OF BATTERY MODULES

(71) Applicant: GM GLOBAL TECHNOLOGY OPERATIONS LLC, Detroit, MI (US)

(72) Inventors: Robert B. Parrish, White Lake, MI (US); Jason A. Lupienski, Birmingham, MI (US); Christopher Warmack, Goodrich, MI (US); Andru O'Farrill, Washington, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 68 days.

(21) Appl. No.: 18/948,614

(22) Filed: Nov. 15, 2024

(65) Prior Publication Data

US 2026/0142219 A1 May 21, 2026

(51) Int. Cl.
*H01M 10/04* (2006.01)
*H01M 50/26* (2021.01)

(52) U.S. Cl.
CPC ... *H01M 10/0404* (2013.01); *H01M 10/0481* (2013.01); *H01M 50/26* (2021.01); *H01M 2220/20* (2013.01)

(58) Field of Classification Search
CPC ......... H01M 10/0404; H01M 10/0481; H01M 10/486; H01M 10/625; H01M 10/653; H01M 10/6554; H01M 50/26; H01M 2220/20; H01M 6/5038; B29C 66/348; B29C 66/3492; B32B 37/08; Y02E 60/10; Y02P 70/50
USPC ............................ 156/282, 498, 64; 429/120
See application file for complete search history.

(56) References Cited

U.S. PATENT DOCUMENTS

| | | | |
|---|---|---|---|
| 8,878,093 | B2 | 11/2014 | Wang et al. |
| 9,120,186 | B2 | 9/2015 | Cai et al. |
| 9,564,639 | B2 | 2/2017 | Huang |
| 10,749,146 | B2 | 8/2020 | Berger et al. |
| 11,018,381 | B2 | 5/2021 | Dawley |
| 2012/0100414 | A1 | 4/2012 | Sonta |

(Continued)

FOREIGN PATENT DOCUMENTS

WO WO-2025222722 A1 * 10/2025 ........ H01M 10/0404

*Primary Examiner* — John L Goff, II
(74) *Attorney, Agent, or Firm* — Quinn IP Law

(57) ABSTRACT

Presented are smart manufacturing systems for optimized curing of adhesives for battery assemblies, methods for making/using such systems, and memory-stored instructions for automating operation of such systems. A method of assembling a battery module includes aligning a stack of battery cells on a workpiece carrier and compressing the cell stack to a predefined length. Module housing side plates are positioned on opposing lateral sides of the compressed cell stack and a heat-cured structural adhesive material (SAM) is injected between the side plates and the lateral sides of the cell stack. A conductive heating system heats the module housing side plates to cure the SAM. While heating the side plates, a cell thermal conditioning system cools a select surface of the compressed cell stack. Upon determining that a monitored cure time reaches a predefined cure time, the system discontinues heating of the side plates and cooling of the battery cells.

20 Claims, 4 Drawing Sheets

(56) References Cited

U.S. PATENT DOCUMENTS

| | | | | |
|---|---|---|---|---|
| 2023/0307756 | A1* | 9/2023 | Maguire ............. | H01M 50/249 |
| 2024/0363952 | A1* | 10/2024 | Kim ..................... | H01M 50/211 |

* cited by examiner

MANUFACTURING SYSTEMS AND METHODS FOR OPTIMIZED CURING OF STRUCTURAL ADHESIVE MATERIALS OF BATTERY MODULES

INTRODUCTION

The present disclosure relates generally to electrochemical devices. More specifically, aspects of this disclosure relate to manufacturing systems and processes for optimized curing of adhesive materials for rechargeable battery modules.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability and relatively inexpensive cost, light weight, and overall efficiency. Such engines include compression-ignited (CI) diesel engines, spark-ignited (SI) gasoline engines, two, four, and six-stroke architectures, and Wankel-type rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

There are four primary types of batteries that are used in electric-drive vehicles: lithium-class batteries, nickel-metal hydride batteries, ultracapacitor batteries, and lead-acid batteries. As per lithium-class designs, lithium-metal and lithium-ion (Li-ion) batteries make up the bulk of commercial lithium battery (LiB) configurations, with Li-ion batteries being employed in automotive applications due to their enhanced stability, energy density, and rechargeable capabilities. A standard lithium-ion cell is generally composed of at least two conductive electrodes, an electrolyte material, and a permeable separator, all of which are enclosed inside an electrically insulated packaging. One electrode serves as a positive ("cathode") electrode and the other electrode serves as a negative ("anode") electrode during cell discharge. The separator—oftentimes a microporous polymeric membrane—is disposed between each mated pair of working electrodes to prevent electrical short circuits while also allowing the transport of ionic charge carriers. Rechargeable Li-ion batteries operate by reversibly passing lithium ions back-and-forth between the negative and positive working electrodes.

Many commercially available hybrid-electric and full-electric vehicles employ a rechargeable traction battery pack to store and supply the requisite power for operating the powertrain's traction motor unit(s). In order to generate tractive power with sufficient vehicle range and speed, a traction battery pack is significantly larger, more powerful, and higher in capacity (Amp-hr) than a standard 12-volt starting, lighting, and ignition (SLI) battery. Contemporary traction battery packs, for example, group stacks of battery cells (e.g., 12-75 cells/group) into individual battery modules (e.g., 10-40 modules/pack) that are mounted onto the vehicle chassis by a battery pack housing or support tray. Stacked electrochemical battery cells may be electrically interconnected through use of an electrical interconnect board (ICB) and front-end DC bus bar assembly. During assembly of a traction battery module, a stack of prismatic battery cells may be interleaved with cell-to-cell separator sheets and seated on a thermal cooling plate that rests on top of the module housing's base plate. End plates of the module housing are placed at front and back ends of the cell stack and housing side plates are placed on lateral sides of the stack; the end and side plates are then welded or crimped together. A structural adhesive material (SAM) may be injected into the gap between the battery cells and side plates to provide additional structural reinforcement and to mitigate shock and vibrational forces on the cells.

SUMMARY

Presented below are smart manufacturing systems with control logic for optimized curing of adhesives for battery assemblies, methods for making and methods for operating such manufacturing systems, and memory-stored instructions for automating operation of such systems. By way of example, and not limitation, a manufacturing control process provides rapid in situ curing of an epoxy-based, acrylic, or polyurethane structural adhesive material using elevated temperatures during assembly of a lithium-class battery module. Line station cooling hardware provides real-time cell thermal conditioning to prevent elevated cell temperatures from exceeding a threshold temperature limit (e.g., 55-85 degrees centigrade (° C.)). Proportional Integral Derivative (PID) controls use closed-loop cell temperature feedback at multiple cell locations (e.g., two on the top and two on the bottom of the cell stack) to automate actively modulated cell cooling. Expedited adhesive curing—over traditional ambient curing techniques and low-temp convective curing techniques—may be provided by targeted conductive heating at the module housing side plates while concurrently extracting heat from the cell bottoms using an indirect liquid cooling (ILC) active thermal management (ATM) system.

Second-order enablers for rapid in situ SAM curing may include cell-to-cell crowding, which reduces total SAM volume and enlarges the wetted thermal interface, and continual cell temperature monitoring with PID-feedback control, which minimizes the risk of cell degradation. Cell crowding may provide consistent energy and time cure expenditures by helping to minimize variations in SAM thickness. Real-time, closed-loop temperature feedback from target points on the top and bottom of select cell casings enables precise activation and modulation of cold plate conditioning to maintain the highest possible curing temperature without exceeding a threshold temperature limit. Attendant benefits for at least some of the disclosed concepts include battery module manufacturing systems and methods that reduce production cycle times while providing higher curing precision with minimal limits to cell heating temperature. Disclosed manufacturing processes and methods may also help to reduce capital investment by eliminating the need for extended storage space, high quantities of pallets, and conveyance for long-term module processing. Other attendant benefits may include achieving proper adhesion strength while reducing SAM volumes by side crowding to ensure higher precision gap.

Aspects of this disclosure are directed to manufacturing system control protocols, system control logic, and memory-stored instructions for optimized curing of battery adhesives. In an example, a method is presented for constructing a battery assembly, such as a vehicle battery module containing a stack of prismatic lithium-class battery cells. This representative method includes, in any order and in any combination with any of the above and below disclosed options and features: aligning, e.g., via an automated cell press station, a stack of battery cells with a reference datum (e.g., Y-direction edge datum) on a workpiece carrier (WPC); compressing, e.g., via the automated cell press station, a stack length of the cell stack to a predefined "final" stack length; applying, e.g., via an automated adhesive injection machine, beads of a heat-cured SAM onto inboard surfaces of first and second module housing side plates; positioning, e.g., via an automated side-plate positioning robot, the module housing side plates with the heat-cured SAM against opposing lateral sides of the compressed cell stack; heating, e.g., using a conductive heating system, the module housing side plates for a monitored cure time to thereby cure the SAM; cooling, e.g., using a cell thermal conditioning system contemporaneous with the heating of the side plates, a select surface of the cell stack to thereby extract thermal energy from the compressed stack of battery cells; and, responsive to a determination that the monitored cure time reaches a predefined cure time, discontinuing the heating of the side plates and the cooling of the battery cells.

Aspects of this disclosure are also directed to computer-readable media (CRM) containing controller-executable instructions that provision optimized curing of battery adhesives. In an example, a non-transient CRM stores instructions that are executable by a system controller (e.g., programmable logic controller (PLC), station control module, integrated circuit (IC) microcontroller device, or network of controllers/modules/devices) of a manufacturing system for assembling a battery module. The battery module includes a stack of battery cells (e.g., lithium-class prismatic battery cells) and a battery module housing (e.g., electrically insulated stamped-metal module case). The CRM-stored instructions, when executed, cause the system controller to perform operations, including: commanding an automated cell press station to align the stack of battery cells with a reference datum on a workpiece carrier; commanding the automated cell press station to compress a stack length of the stack of battery cells to a predefined stack length to create a compressed stack of battery cells; commanding an automated adhesive injection machine to inject a heat-cured SAM onto inboard surfaces of first and second side plates of a battery module housing of the battery module; commanding an automated side-plate positioning robot to position the first and second side plates with the heat-cured SAM against outboard surfaces of first and second lateral sides, respectively, of the compressed stack of battery cells; commanding a conductive heating system to heat the first and second side plates of the battery module for a monitored cure time to thereby cure the heat-cured SAM; commanding a cell thermal conditioning system to cool a bottom stack surface of the compressed stack of battery cells to thereby extract thermal energy from the battery cells contemporaneous with the heating the first and second side plates; and commanding the conductive heating system to discontinue the heating of the first and second side plates and the cell thermal conditioning system to discontinue the cooling of the select stack surface of the compressed stack of battery cells responsive to a determination that the monitored cure time equals or exceeds a predefined cure time.

Additional aspects of this disclosure are directed to automated, in-line battery manufacturing systems for assembling a battery module, such as rechargeable battery modules for vehicle battery packs. As used herein, the terms "vehicle" and "motor vehicle" may be used interchangeably and synonymously to include any relevant vehicle platform, such as passenger vehicles, commercial vehicles, industrial vehicles, tracked vehicles, off-road and all-terrain vehicles (ATV), motorcycles, farm equipment, watercraft, aircraft, spacecraft, etc. For non-automotive applications, disclosed concepts may be implemented for any logically relevant use, including portable power stations, photovoltaic systems, pumping equipment, wind turbine farms, server systems, etc. In an example, a battery module manufacturing system includes an automated cell press station, an automated side-plate positioning robot, an automated adhesive injection machine, a conductive heating system, and a cell thermal conditioning system, each of which may be a standalone assembly-line workstation or may be combined into one or more group workstations.

Continuing with the discussion of the foregoing example, the manufacturing system includes a system controller that is programmed to command the cell press station to align the cell stack with a reference datum on a workpiece carrier and, once aligned, command the cell press station to compress the cell stack to a predefined stack length. The system controller also commands the adhesive injection machine to apply a heat-cured SAM onto inboard surfaces of module housing side plates and, once the SAM is applied, commands the side-plate positioning robot to position the side plates with the SAM on opposing lateral sides of the compressed cell stack. The system controller then commands the conductive heating system to heat the housing side plates for a monitored cure time to thereby cure the SAM; while heating the side plates, the system controller commands the cell thermal conditioning system to cool a select surface or surfaces of the compressed cell stack to thereby extract thermal energy from the battery cells. Upon determining that the monitored cure time has reached a predefined cure time, the system controller responsively commands the conductive heating system to cease the heating of the side plates and the cell thermal conditioning system to cease the cooling of the battery cells.

For any of the disclosed systems, methods, and CRM, heating of the module housing side plates may include placing conductive heating elements of the conductive heating system against the side plates and, once placed, activating the two conductive heating elements. Before activating the two conductive heating elements, it may be desirable to press a pair of side-plate clamps against the module housing side plates. As another option, cooling the battery cells may include placing a cooling plate against a bottom-side surface or a top-side surface of the cell stack and, once placed, circulating a cooling fluid across the cooling plate. The system controller may track the monitored cure time during which the side plates are conductively heated and actively determine when the monitored cure time equals or exceeds the predefined cure time.

For any of the disclosed systems, methods, and CRM, the system controller may communicate with a networked array of temperature sensors that are thermally coupled to the compressed cell stack to receive therefrom sensor signals indicative of a real-time cell stack temperature during the heating of the side plates. Upon determining that the cell stack temperature reaches or exceeds a threshold temperature limit, the system controller may temporarily pause the heating of the side plates while continuing the cooling of the compressed cell stack. After pausing the heating of the side plates, the system controller may communicate with the temperature sensor array to receive therefrom new sensor signals indicative of a new cell stack temperature. Upon determining that the new cell stack temperature is below the threshold temperature limit, the system controller may responsively resume the heating of the side plates while continuing the cooling of the battery cells. As a further option, the system controller may actively modulate a real-time thermal output of the conductive heating system based on the sensor signals received from the temperature sensors. In this instance, the system controller may actively coordinate a real-time cooling output of the cell thermal conditioning system with the real-time thermal output of the conductive heating system.

For any of the disclosed systems, methods, and CRM, compressing the stack length of the stacked battery cells may include positioning a pair of module housing end plates on opposing longitudinal ends of the cell stack and, once positioned, using an automated cell press station to press the end plates towards each other. After compressing the cell stack with the two end plates and then positioning the two side plates on the lateral sides of the cell stack, opposing longitudinal end segments of each side plate may be welded, crimped, and/or fastened to lateral end segments of the two end plates. Prior to joining the module housing side plates with the module housing end plates, inboard faces of the two side plates may be pressed against the lateral sides of the compressed cell stack. In tandem, base flanges projecting orthogonally from bottom edges of the two side plates may be pressed against a bottom-side surface of the compressed cell stack. After completing the heating of the two side plates and the cooling of the compressed cell stack, the resultant module preassembly—composed of the compressed cell stack seated on the workpiece carrier with the cured SAM joining the cell stack to the module housing side plates—is transferred to a cooling buffer station. Once transferred, the module preassembly is chilled in the cooling buffer station for a predefined chill time. The module preassembly may then be transferred to another station to complete construction of the battery module.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
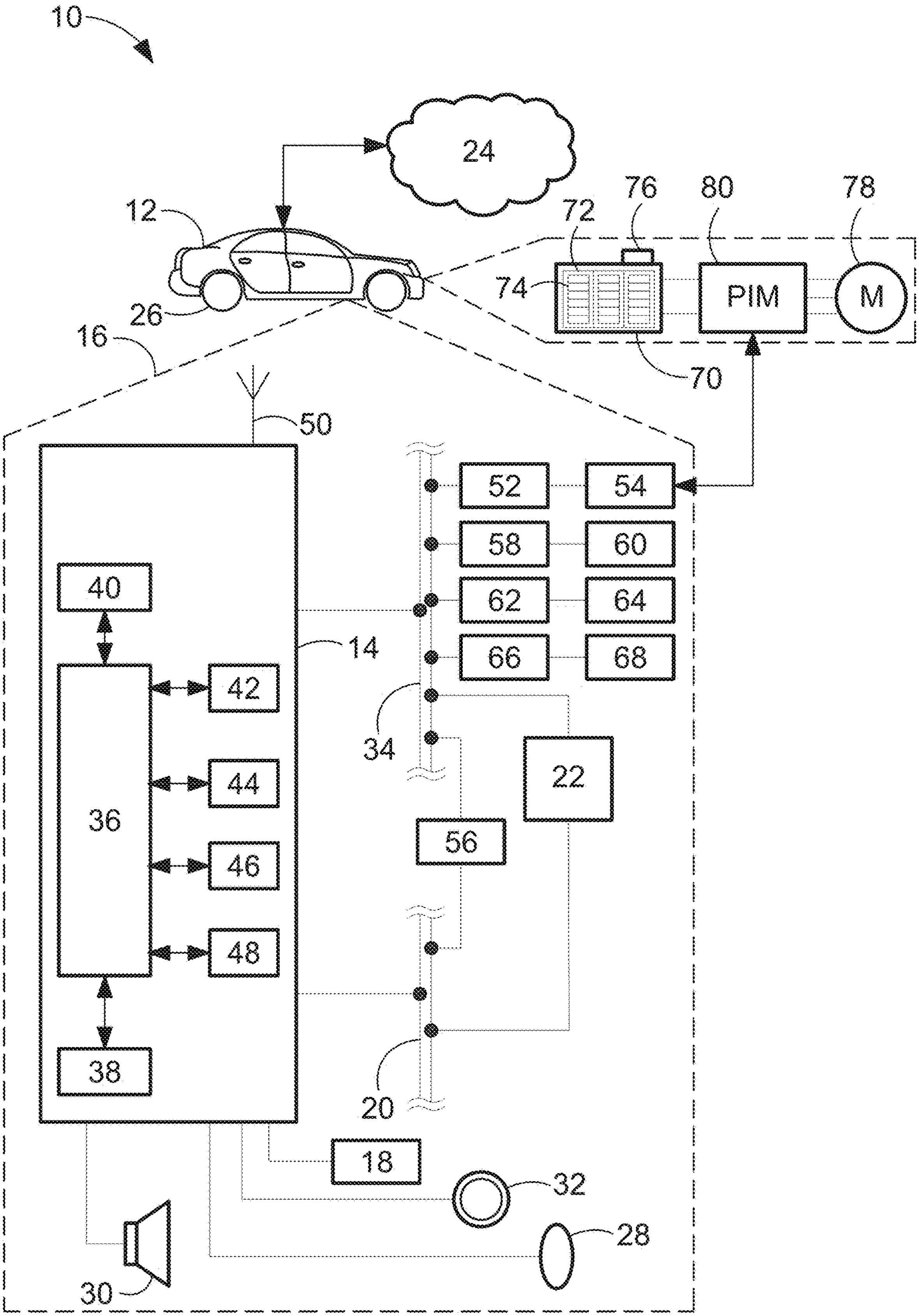
FIG. 1 is a partially schematic, side-view illustration of a representative motor vehicle that is propelled by an electrified powertrain and powered by a traction battery pack that contains multiple rechargeable battery modules with which aspects of this disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Brief Description of the Drawings, and Detailed Description sections, but not explicitly set forth in the claims, should not be incorporated into the claims, singly or collectively, by implication, inference or otherwise. Moreover, recitation of “first”, “second”, “third”, etc., in the specification or claims is not per se used to establish a serial or numerical limitation; unless specifically stated otherwise, these designations may be used for ease of reference to similar features in the specification and drawings and to demarcate between similar elements in the claims.

For purposes of this disclosure, unless specifically disclaimed: the singular includes the plural and vice versa (e.g., indefinite articles “a” and “an” should generally be construed as meaning “one or more”); the words “and” and “or” shall be both conjunctive and disjunctive; the words “any” and “all” shall both mean “any and all”; and the words “including,” “containing,” “comprising,” “having,” and the like, shall each mean “including without limitation.” Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a representative motor vehicle, which is designated generally at 10 and portrayed herein for purposes of discussion as a sedan-style, electric-drive automobile. The illustrated automobile 10—also referred to herein as "motor vehicle" or "vehicle" for short—is merely an exemplary application with which aspects of this disclosure may be practiced. In the same vein, incorporation of the present concepts into the illustrated battery manufacturing system for assembling vehicle battery modules containing prismatic, lithium-class battery cells should be appreciated as a non-limiting implementation of disclosed features. As such, it will be understood that aspects and features of this disclosure may be incorporated into other manufacturing system architectures, may be utilized for constructing any logically relevant type of battery assembly, and may be utilized for both automotive and non-automotive applications alike. Moreover, only select components of the motor vehicle, manufacturing system, and battery cell are shown and described in detail herein. Nevertheless, the vehicles, systems and cells discussed below may include numerous additional and alternative features, and other available peripheral hardware, for carrying out the various methods and functions of this disclosure.

The representative vehicle 10 of FIG. 1 is originally equipped with a vehicle telecommunications and information ("telematics") unit 14 that wirelessly communicates, e.g., via cellular network, satellite service, wireless-enabled modem, etc., with a remotely located or "off-board" cloud computing host service 24 (e.g., ONSTAR®). Some of the other vehicle hardware components 16 shown in FIG. 1 include, as non-limiting examples, a video display device 18, a microphone 28, audio speaker(s) 30, and assorted user input controls 32 (e.g., buttons, knobs, switches, touchscreens, etc.). These components 16 function, in part, as a human/machine interface (HMI) that enables a user to communicate with the telematics unit 14 and other components both resident to and remote from the vehicle 10. Microphone 28, for instance, provides occupants with a means to input verbal commands; the vehicle 10 employs embedded audio filtering, editing, and analysis modules for processing the commands. Conversely, the speaker 30 provides audible output to vehicle occupants and may be either a stand-alone speaker or may be part of an audio system 22. The audio system 22 is connected to a network connection interface 34 and an audio bus 20 to receive analog information, rendering it as sound, via one or more speaker components.

Communicatively coupled to the telematics unit 14 is a network connection interface 34, suitable examples of which include fiberoptic Ethernet switches, parallel/serial communications buses, local area network (LAN) interfaces, controller area network (CAN) interfaces, and the like. The network connection interface 34 enables the vehicle hardware 16 to send and receive signals with one another and with various systems both onboard and off-board the vehicle body 12. This allows the vehicle 10 to perform assorted vehicle functions, such as modulating powertrain output, activating friction and regenerative brake systems, controlling vehicle steering, and other automated functions. For instance, telematics unit 14 may exchange signals with a Powertrain Control Module (PCM) 52, an Advanced Driver Assistance System (ADAS) module 54, an Electronic Battery Control Module (EBCM) 56, a Steering Control Module (SCM) 58, a Brake System Control Module (BSCM) 60, and assorted other vehicle ECUs, such as a transmission control module (TCM), engine control module (ECM), Sensor System Interface Module (SSIM), etc.

With continuing reference to FIG. 1, telematics unit 14 is an onboard computing device that provides a mixture of services, both individually and through its communication with other networked devices. This telematics unit 14 may be generally composed of one or more processors 40, each of which may be embodied as a discrete microprocessor, an application specific integrated circuit (ASIC), or a dedicated control module. Vehicle 10 may offer centralized vehicle control via a central processing unit (CPU) 36 that is operatively coupled to a real-time clock (RTC) 42 and one or more electronic memory devices 38, each of which may take on the form of a CD-ROM, magnetic disk, IC device, a solid-state drive (SSD) memory, a hard-disk drive (HDD) memory, flash memory, semiconductor memory (e.g., various types of RAM or ROM), etc.

Long-range communication (LRC) capabilities with remote, off-board devices may be provided via one or more or all of a cellular chipset/component, a navigation and location chipset/component (e.g., global positioning system (GPS) transceiver), or a wireless modem, all of which are collectively represented at 44 in FIG. 1. Close-range wireless connectivity may be provided via a short-range communication (SRC) device 46 (e.g., a BLUETOOTH® unit or near field communications (NFC) transceiver), a dedicated short-range communications (DSRC) component 48, and/or a dual antenna 50. The communications devices described above may provision data exchanges as part of a periodic broadcast in a vehicle-to-vehicle (V2V) communication system or a vehicle-to-everything (V2X) communication system.

CPU 36 receives sensor data from one or more sensing devices that use, for example, photo detection, radar, laser, ultrasonic, optical, infrared, or other suitable technology, for executing a controller-automated (AV/ADAS) driving operation or a vehicle navigation service. In accord with the illustrated example, the automobile 10 may be equipped with one or more digital cameras 62, one or more range sensors 64, one or more vehicle speed sensors 66, one or more vehicle dynamics sensors 68, and any requisite filtering, classification, fusion, and analysis hardware and software for processing raw sensor data. The type, placement, number, and interoperability of the distributed array of in-vehicle sensors may be adapted, singly or collectively, to a given vehicle platform for achieving a desired level of automated vehicle operation.

To propel the motor vehicle 10, an electrified powertrain is operable to generate and deliver tractive torque to one or more of the vehicle's drive wheels 26. The powertrain is represented in FIG. 1 by an electric traction motor (M) 78 that is operatively connected to a rechargeable, chassis-mounted traction battery pack 70. The traction battery pack 70 is generally composed of one or more battery modules 72 each containing a cluster of battery cells 74, such as lithium-class or organosilicon-class cells of the pouch, prismatic, or cylindrical type. One or more electric machines, such as traction motor/generator (M) units 78, draw electrical power from and, optionally, deliver electrical power to the battery pack 70. A power inverter module (PIM) 80 electrically connects the battery pack 70 to the motor(s) 78 and modulates the transfer of electrical current therebetween. The battery pack 70 may include an integrated electronics package, such as a wireless-enabled cell monitoring unit (CMU) 76, that enables module management, cell sensing, and module communications functionality.

Figure 2:
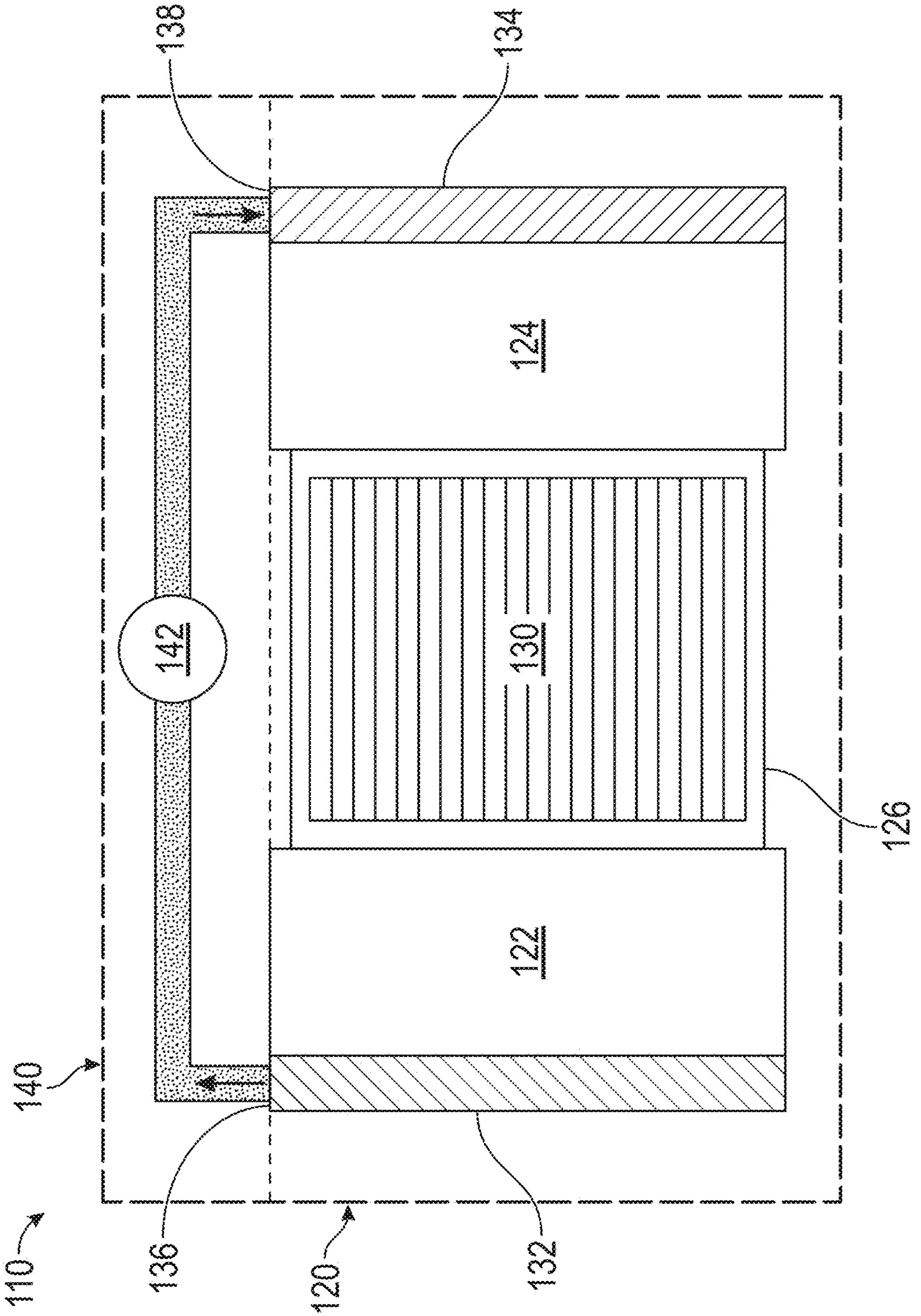
FIG. 2 is a schematic illustration of a representative electrochemical device with which aspects of this disclosure may be practiced.

Presented in FIG. 2 is an exemplary electrochemical device in the form of a rechargeable lithium-class battery 110 that powers a desired electrical load, such as motor 78 of FIG. 1. Battery 110 includes a series of electrically conductive electrodes, namely a first (negative or anode) working electrode 122 and a second (positive or cathode) working electrode 124 that are stacked or rolled and packaged inside a protective outer housing 120 (also referred to herein as "cell case"). Reference to either working electrode 122, 124 as an "anode" or "cathode" or, for that matter, as "positive" or "negative" does not limit the electrodes 122, 124 to a particular polarity as the system polarity may change depending on whether the battery 110 is being operated in a charge mode or a discharge mode. The device housing 120 may take on a cylindrical construction, a pouch construction, or a prismatic construction that is formed of aluminum, nickel-plated steel, ABS, PVC, or other suitable material. A metallic case may be coated with a polymeric finish to insulate the metal from internal cell elements and from adjacent cells. Although FIG. 2 shows a single galvanic monocell unit enclosed within the cell case 120, it should be appreciated that the housing 120 may store a stack or roll of monocell units (e.g., five to 500 cells or more).

Anode electrode 122 may be fabricated with an active anode electrode material that is capable of incorporating lithium ions during a battery charging operation and releasing lithium ions during a battery discharging operation. For at least some designs, the anode electrode 122 is manufactured, in whole or in part, from a lithium metal, such as lithium-aluminum (LiAl) alloy materials with an Li/Al atomic ratio (as indicated by an atomic percent (at. %) of one type of atom relative to a total number of atoms) in a range from 0 at. %≤Li/Al≤70 at. %, and/or aluminum alloys with Al atomic ratio >50 at. % (e.g., lithium metal is smelt). Additional non-limiting examples of suitable active anode materials include carbonaceous materials (e.g., graphite, hard or soft carbon etc.), silicon, silicon-carbon blended materials (silicon-graphite composite), $Li_4Ti_5O_{12}$, transition-metals (alloy types, e.g., Sn), metal oxide/sulfides (e.g., $SnO_2$, FeS and the like), etc.

Cathode electrode 124 may be fabricated with an active cathode electrode material that is capable of supplying lithium ions during a battery charging operation and incorporating lithium ions during a battery discharging operation. The cathode 124 material may include, for instance, lithium transition metal oxide, phosphate (including olivines), or silicate, such as $LiMO_2$ (M═Co, Ni, Mn, or combinations thereof); $LiM_2O_4$ (M═Mn, Ti, or combinations thereof), $LiMPO_4$ (M═Fe, Mn, Co, or combinations thereof), and LiMxM'2-xO4 (M, M'═Mn or Ni). Additional non-limiting examples of suitable active cathode materials include lithium nickel cobalt manganese oxide (NCM), lithium nickel cobalt aluminum oxide (NCA), lithium nickel cobalt manganese aluminum oxide (NCMA), and other lithium transition-metal oxides.

Disposed inside the cell case 120 of FIG. 2 and sandwiched between each mated pair of working electrodes 122, 124 is an electrically isolating porous separator 126. The separator 126 may be in the nature of an electrically non-conductive, ion-transporting microporous or nanoporous polymeric separator sheet. Separator 126 may be a sheet-like structure that is composed of a porous polyolefin membrane, e.g., with a porosity of about 35% to about 65%. Electrically non-conductive ceramic particles (e.g., silica) may be coated onto the porous membrane surfaces of the separators 126. The porous separator 126 may incorporate a non-aqueous fluid electrolyte composition, a solid electrolyte composition, and/or a quasi-solid electrolyte composition, collectively designated 130, which may also be present in the negative electrode 122 and the positive electrode 124. The porous separator 126 may operate as both an electrical insulator and a mechanical support structure by being sandwiched between the two electrodes 122, 124 to prevent the electrodes from physically contacting each other and, thus, the occurrence of a short circuit. In addition to providing a physical barrier between the electrodes 122, 124, the separator 126 may provide a minimal resistance path for internal passage of lithium ions (and related anions) during cycling of the lithium ions to facilitate functioning of the battery 110.

A negative electrode current collector 132 of the electrochemical battery cell 110 may be positioned on or near the negative electrode 122, and a positive electrode current collector 134 may be positioned on or near the positive electrode 124. The negative electrode current collector 132 and positive electrode current collector 134 respectively collect and move free electrons to and from an external circuit 140. An interruptible external circuit 140 with a load 142 connects to the negative electrode 122, through its respective current collector 132 and negative electrode tab 136, and to the positive electrode 124, through its respective current collector 134 and positive electrode tab 138.

Operating as a rechargeable energy storage device, the battery 110 generates electric current that is transmitted to one or more electric loads 142 operatively connected to the external circuit 140. While the load 142 may be any number of devices, a few non-limiting examples of power-consuming devices include electric traction motors for hybrid-electric and full-electric vehicles, photovoltaic cell arrays, standalone power stations and portable power packs, server systems, wind turbine farms, etc. The battery cell 110 may include a variety of other components including fluid-sealing gaskets, terminal caps, cell headers, tabs, battery terminals, cooling hardware, charging hardware, and other commercially available components that may be situated on or in the battery 110. Moreover, the size and shape and operating characteristics of the battery 110 may vary depending on the particular application for which it is designed.

During the construction of a rechargeable battery module that contains a stack of battery cells, a structural adhesive material may be introduced into the battery module housing to form a load-bearing, shock-attenuating structural joint that secures the cells to the module housing. Rather than applying the SAM during curing, which may cause spider webbing with a concomitant reduction of the adhesive's resultant shear strength, it may be desirable to inject the entire module-calibrated volume of adhesive and cure the SAM while inside the module housing (i.e., in situ). Structural adhesives may require a lengthy period of time to cure at ambient (room) temperatures; it may therefore be desirable to introduce a heat catalyst to greatly reduce the time needed to cure the SAM (e.g., targeted heating at 80° C. may reduce cure time from four (4) hours to less than ten (10)

mins). Doing so may provide a substantial cost-avoidance savings with a significantly reduced capital investment. However, applying heat to the battery module housing for extended periods may expose the battery cells to undesirably high temperatures. To maintain the highest possible curing temperature without driving cell temperatures to unwanted levels (e.g., exceeding ~55-60° C.), an active thermal management system may be employed to balance heating of the module housing with heat rejection of the battery cells. Temperature gradients may be observed at select times using, for example, top and bottom cell temperature monitoring.

A cell datum strategy may be employed to crowd and compress the battery cells in the transverse (X or cell-width) direction and the longitudinal (Y or stack-length) direction to minimize cell-to-cell and cell-to-stack spacing variations and to maintain consistent adhesive gaps that enable full cure consistently in the shortest time on crowded side. The stacked cells may "crowded" to one side of the module housing to push tolerance to the opposite side of stack; housing side plates are then pressed into place on both sides. Clamps may be placed on both module housing side plates to ensure proper wet out and retention is achieved for curing. Reduction in cell variation on non-crowded sides will facilitate full adhesion given largest cell and thinnest adhesive. Variations in shear strength may be minimized to achieve a minimum allowable secure handling strength by reducing cell-to-cell SAM variations. Conductive module housing heating and conductive battery cell cooling can be controlled and tuned by a single central controller (as shown) or by a network of dedicated control modules. Cell temperature and side plate temperature may be monitored throughout the curing process and adjusted in real-time via a Proportional Integral Derivative (PID) controller to ensure cells do not exceed a threshold temperature limit (e.g., 55-85° C.).

Figure 3:
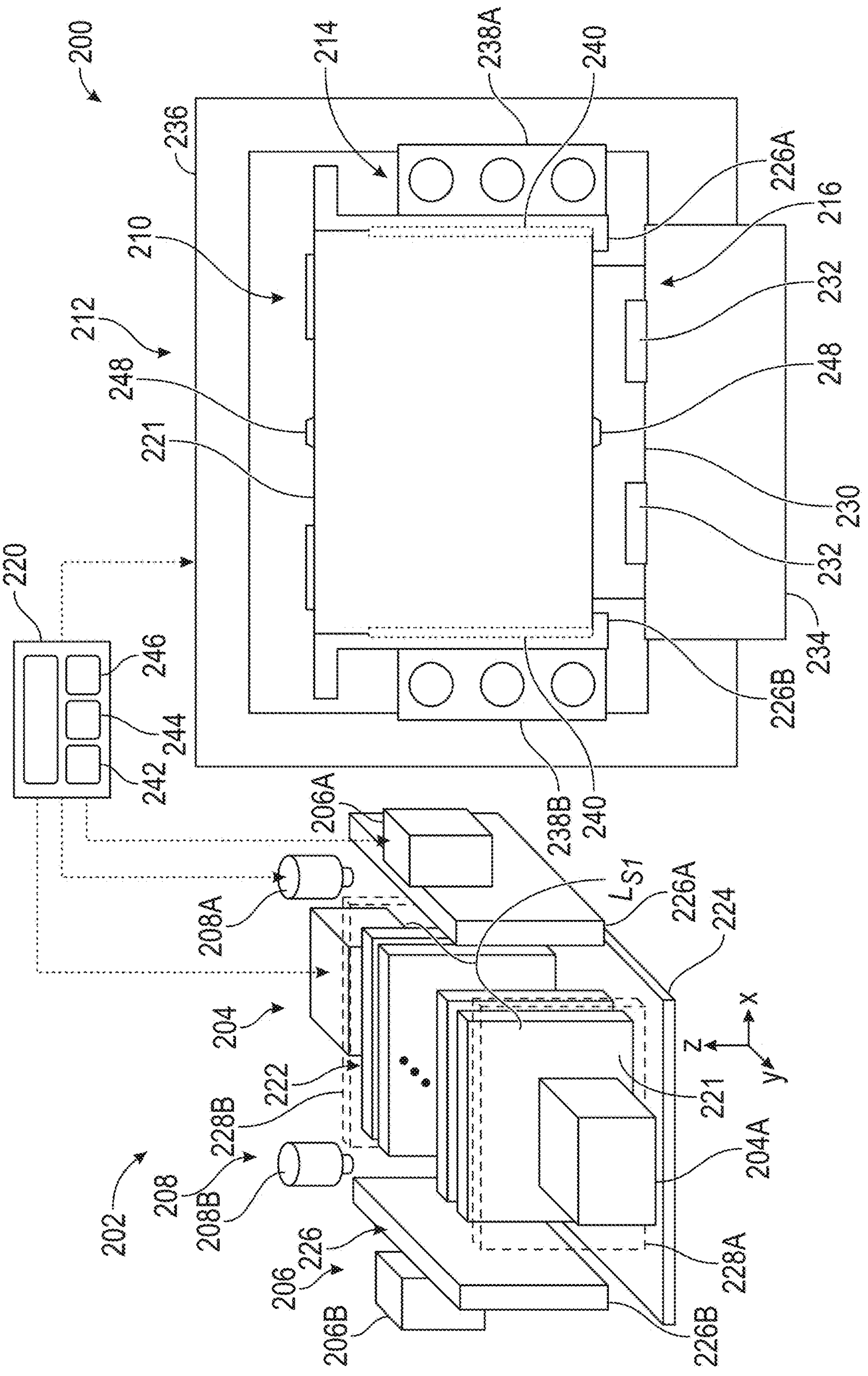
FIG. 3 is a schematic illustration of a representative smart manufacturing system for active cell cooling and high-temperature conductive curing of a structural adhesive material in a battery module in accord with aspects of the present disclosure.

FIG. 3 schematically illustrates a non-limiting example of a smart battery manufacturing system 200 for automating assembly of a battery module 210. In accord with the illustrated example, the smart battery manufacturing system 200 includes a compress and weld (C&W) workstation 202 that contains an automated cell press substation 204, an automated side-plate positioning robot substation 206, and an automated adhesive injection substation 208. On the same assembly line of the manufacturing system 200, e.g., downstream from the C&W workstation 202, is a heating buffer workstation 212 that contains a conductive heating subsystem 214 and a cell thermal conditioning subsystem 216. It should be appreciated that the smart battery manufacturing system 200 may contain greater or fewer workstations than that which are shown in FIG. 3, e.g., to provide additional or alternative manufacturing functionality. As yet a further option, the individual workstations 202, 212 of the manufacturing system 200 may include additional or fewer substations or, if desired, may be broken out such that one or more of the individual substations are embodied as distinct workstations. For instance, cell press substation 204 may be part of a standalone Compress & Crowd (C&C) station and the adhesive injection substation 208 may be part of a standalone Weld & Clamp (W&C) station.

With continuing reference to FIG. 3, a central system controller 220 may control the automated cell press substation 204 to align a stack 222 of individual battery cells 221 (collectively "cell stack") with a reference datum (e.g., Y-direction edge datum) on a workpiece carrier (WPC) 224. After aligning the cells, the central system controller 220 may also control the automated cell press substation 204 to compress a stack length $L_{S1}$ of the cell stack 222 to a predefined stack length, which may be calibrated to the specific design parameters and associated constraints of the intended battery module application. Once the cells are compressed together, the central system controller 220 may command the side-plate positioning robot substation 206 to position a pair of (first and second) side plates 226A and 226B of a battery module housing 226 on opposing (first and second) lateral sides of the compressed stack 222 of battery cells 221. Prior to, contemporaneous with, or after positioning the side plates and/or welding the side plates to a pair of (first and second) end plates 228A and 228B, the central system controller 220 may control the adhesive injection substation 208 to inject beads of a heat-cured SAM 240 onto inboard-facing surfaces of the module housing side plates 226A, 226B. Additional details regarding the initial assembly operations for preparing the battery cells 221 and the module housing 226 for adhesive curing are provided below in the discussion of FIG. 4.

Once the heat-cured SAM 240 is injected and the side plates 226A, 226B properly positioned, the module WPC 224 is transferred to the heating buffer workstation 212. The stack 222 of battery cells 221 may then be placed on top of a fluid-cooled conductive cooling platen 230 that is buttressed on pallet rails 232 of a mobile support pallet 234. As shown, the thermal conditioning subsystem 216 may be an indirect liquid cooled (ILC) active thermal management (ATM) system in which the cooling platen 230 acts as a heat sink that extracts thermal energy from the battery cells 221 via conductive heat transfer to a liquid refrigerant. A nylon-covered metal handling fixture 236 with clamps may then be applied to secure the WPC 224 in place. The handling fixture 236 may retain the side plate 226A, 226B and apply an inward force across each side plate 226A, 226B during the heating and curing operations. A pair of (first and second) electrically or fluidly activated thermal-coil heating elements 238A and 238B, which may be integrated into the handling fixture 236, are pressed against the outboard faces of side plate 226A, 226B.

The central system controller 220 may thereafter control the conductive heating subsystem 214 to press against and heat the two module housing side plates 226A, 226B for a monitored cure time to cure the SAM. In tandem with this heating, the central system controller 220 may control the cell thermal conditioning subsystem 216 to cool a bottom stack surface of the compressed cell stack 222 in order to extract thermal energy from the battery cells. Cell cooling may be actively modulated—real-time controller-automated cooling increases/decreases—throughout the curing process based on closed-loop cell temperature feedback. SAM heating may also be actively modulated or, alternatively, may be set to a module-calibrated setpoint value and selectively turned on and off throughout the cure process. When the monitored cure time reaches a predefined cure time (e.g., approximately 4-10 minutes (mins)), the central system controller 220 may deactivate the conductive heating subsystem 214 to discontinue further heating of the side plates 226A, 226B and concurrently deactivate the cell thermal conditioning subsystem 214 to discontinue further cooling of the cell stack 222. Additional details regarding the parallel heating of the module housing 226 and cooling of the battery cells 221 to cure the SAM 240 are provided below in the discussion of FIG. 4.

Figure 4:
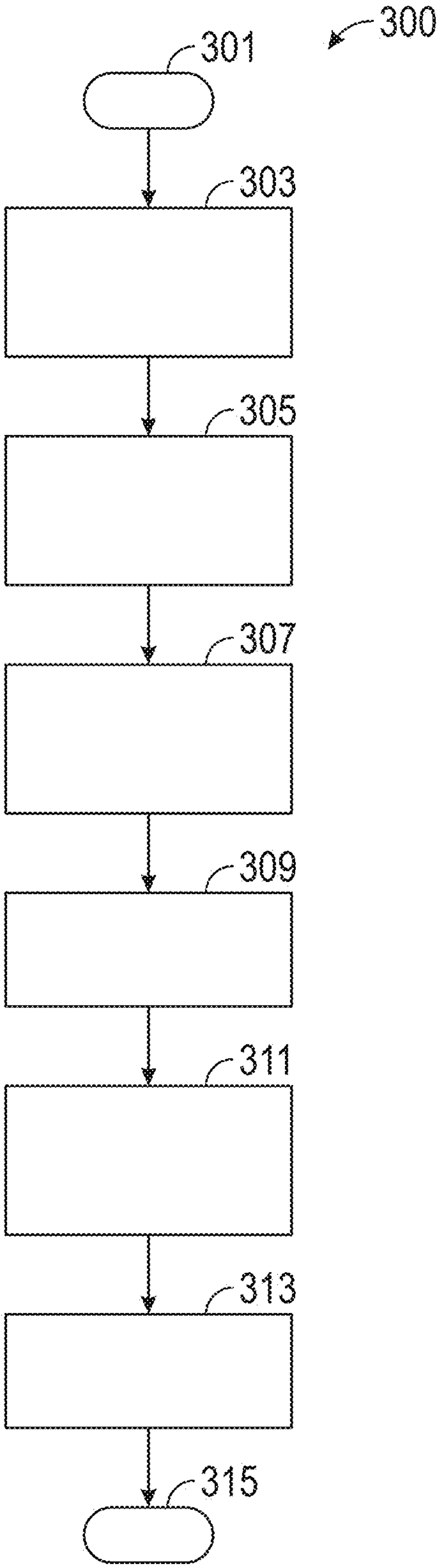
FIG. 4 is flowchart illustrating a representative manufacturing control process and method for in-line automation of conductive SAM curing for a battery module, which may correspond to memory-stored instructions that are executable by a resident or remote microcontroller, programmable logic circuit, control module, or other integrated circuit (IC) device or network of circuits/modules/microcontrollers/devices (collectively “system controller”) in accordance with aspects of the disclosed concepts.

With reference next to the flow chart of FIG. 4, an improved method or workflow process for thermally conductive curing of a structural adhesive for a battery assembly, such as traction battery pack modules 72 of FIG. 1, using a smart manufacturing system, such as automated, in-line battery manufacturing system 200 of FIG. 3, is generally described at 300 in accordance with aspects of the present disclosure. Some or all of the operations illustrated in FIG. 4 and described in further detail below may be representative of an algorithm that corresponds to non-transitory, processor-executable instructions that are stored, for example, in main or auxiliary or remote memory (e.g., resident system memory 242 of FIG. 3 and/or remote cloud computing 24 database of FIG. 1). These instructions may be executed, for example, by an electronic controller, processing unit, dedicated control module, logic circuit, or other module or device or network of controllers/modules/devices (e.g., central system controller 220 of FIG. 3 and/or networked workstation control modules), to perform any or all of the above and below described functions associated with the disclosed concepts. It should be recognized that the order of execution of the illustrated operation may be changed, additional operation may be added, and some of the herein described operations may be modified, combined, or eliminated.

Method 300 begins at START terminal block 301 of FIG. 4 with memory-stored, processor-executable instructions for initializing an automated battery module assembly protocol. Terminal block 301 may initialize responsive to a user command prompt (e.g., via line-side workstation computer input controls 244), responsive to a resident system controller prompt (e.g., from central system controller 220), and/or responsive to a sensor signal indicating a new battery assembly has entered the workstation. By way of non-limiting example, a predefined number of battery cells, such as thirty-six (36) lithium-class, prismatic battery cells 221 of FIG. 3, are stacked in face-to-face relation with one another; an electrically insulating separator panel or a thermal runaway barrier (TRB) frame may be interleaved between each pair of neighboring cells. Cell isolator panels may optionally be inserted between outboard faces of the front-most (first) and rear-most (last) cells and inboard faces of the module housing end plates, such as end plates 228A, 228B of FIG. 3. The stacked cells with interleaved separator panels, TRB frames, and isolator panels may then be loaded onto a support plate, such as WPC 224 of FIG. 3, and transferred to the next module assembly workstation, such as C&W workstation 202. Upon completion of some or all of the control operations presented in FIG. 4, the method 300 may advance to END terminal block 315 and temporarily terminate or, optionally, may loop back to START terminal block 301 and run in a continuous loop.

Advancing from terminal block 301 to CROWD AND COMPRESS process block 303, method 300 of FIG. 4 aligns the stack of battery cells with one or more reference datum on the workpiece carrier and, once aligned, compresses a front-to-back stack length (e.g., in the Y-direction of FIG. 3) of the cell stack to a predefined "final" stack length. Continuing with the discussion of the example of FIG. 3, the module WPC 224—including the cell stack 222 supported thereon—is passed to the C&W workstation 202; the WPC 224 is then lifted into and secured inside of the automated cell press substation 204. The WPC 224 may secure the cell stack 222 between a fixed end wall and a slidable end wall, the latter of which may be secured in place with a lock or brake mechanism that prevents inadvertent cell movement, e.g., both prior to and after compressing the cells 221. After loading the WPC 224 into the cell press substation 204, the lock/brake mechanism on the slidable end wall may be disengaged such that the cells 221 may be aligned (or "crowded") along a lateral edge datum (e.g., in the Y-direction) on the WPC 224. Recognizing that the individual battery cells 221 may have slightly different widths due to manufacturing tolerance variations, for example, the cell stack 222 may be pushed against a flat datum bar that is supported on the WPC 224 and located on one side of the cell stack 222. This datum bar may be machined to a precision tolerance to ensure that all cells 221 in the stack 222 may seat flush against the bar.

After stacking and crowding the battery cells, the cell stack may be controllably compressed to a module-calibrated final stack length. In a non-limiting example, front and back end plates 228A and 228B, respectively, of the battery module housing 226 may be placed at front (first) and back (second) longitudinal ends, respectively, of the cell stack 222, as best seen in FIG. 3. A pneumatic, hydraulic, or electromechanically driven ram 204A of the cell press substation 204 may be positioned against the slidable end wall of the WPC 224 and thereafter activated to push the front end plate 228A and, thus, the front-most cell 221 towards the rear-most cell 221 and the rear end plate 228B. To prevent unintentional expansion of the cell stack 222 after compressing the cells 221, the lock/brake mechanism on the slidable end wall of the WPC 224 may be re-engaged.

Prior to, contemporaneous with, or after compressing the cell stack, port (first) and starboard (second) side plates of the battery module housing may be placed on port (first) and starboard (second) lateral sides, respectively, of the compressed cell stack. For instance, vacuum-type robotic grippers 206A and 206B of the side-plate positioning robot substation 206 grasp and load the two side plates 226A, 226B into the module preassembly unit. Once loaded, the side plates 226A, 226B may be indexed in a transverse (X) direction, e.g., to seat against a side-plate clamping unit and press the inboard faces of the side plates 226A, 226B against the lateral sides of the compressed cell stack 222. At the same time, the side plates 226A, 226B may be indexed in a vertical (Z) direction, e.g., to press inwardly projecting base flanges of the side plates 226A, 226B against a bottom-side face of the compressed cell stack 222. At this juncture, the side plates 226A, 226B may be held in place by the clamping unit and vacuum grippers 206A, 206B. For system architectures in which the cell press substation 204 is separate from the adhesive injection substation 208, the compressed cell stack 222, side plates 226A, 226B, end plates 228A, 228B, and module WPC 224 may be synchronously moved from one substation 204 to the next substation 208.

With continuing reference to FIG. 4, method 300 proceeds to WELD AND CLAMP process block 305 to structurally interconnect the battery module housing side plates with housing end plates and the compressed cell stack. Central system controller 220 of FIG. 3, for example, may coordinate with the adhesive injection substation 208 to activate a pair of adhesive dispensing applicators 208A and 208B in order to inject beads of an acrylic, polyurethane, or epoxy-based heat-cured SAM onto interior faces of the module housing side plates 226A, 226B such that the SAM is sandwiched between the side plates 226A, 226B and lateral sides of the compressed cell stack 222. Once injected, the system controller 220 may commence an adhesive open-time (OT) check and concomitantly start an OT timer on a real-time clock 246 to ensure that the module subassembly with the injected SAM is transferred to the heating buffer workstation 212 before the bonding force of the adhesive begins to breakdown (e.g., approximately 10 minutes after applying the SAM). The SAM's "adhesive open time" may be defined as a manufacturer-defined timeframe during which the SAM may be applied and manipulated before the adhesive starts to set and form a skin that prevents bonding.

At this juncture, the side-plate clamping units may directly align and push the side plates 226A, 226B across the WPC 224 in the X-direction and against the cell stack 222. The module housing side plates 226A, 226B may also be pressed to the stack 222 in the Y-direction and in the Z-direction. Once aligned and pressed, opposing longitudinal terminal ends of each side plate 226A, 226B may be welded to respective opposing lateral edges of each end plate 228A, 228B. After the welding is complete, the side-plate clamps may be released, the WPC lock/brake mechanism may be closed, and the WPC with stack may be placed on a conveyor system for transfer to the next workstation. An in-line inspection may be performed to examine the side-plate welds.

Method 300 advances from WELD AND CLAMP process block 305 to CLAMP AND APPLY process block 307 to prep the stacked battery cells, the module housing, and the heat-curable SAM for thermal treatment. After the module WPC 224 arrives at the heating buffer workstation 212 of FIG. 3, for example, the clamps of the handling fixture 236 may be applied to secure the WPC 224 in place. The handling fixture 236 clamps increase surface wet out the SAM 240 that will, in turn, facilitate joining of the side plate 226A, 226B to the battery cells 221. The WPC 224 may be removed and the conductive cooling platen 230 of the cell thermal conditioning subsystem 216 may thereafter be pressed against the underside surfaces of stacked cells 221. In tandem, the thermal-coil heating elements 238A and 238B are pressed against outboard lateral faces of the module housing side plates 226A, 226B. At this juncture, the central system controller 220 may commence cell conditioning by coordinating with the thermal conditioning subsystem 216 to activate the cooling platen 230 and start cooling the battery cells 221.

Method 300 of FIG. 4 may thereafter proceed to CURE AND CONTROL process block 309 to commence the coordinated heating of the module housing and cooling of the battery cells. Central system controller 220 of FIG. 4, for example, may command the heating buffer workstation 212 to activate the thermal-coil heating elements 238A and 238B and thereby conductively heat the two module housing side plates 226A, 226B and concomitantly heat-cure the SAM 240. Simultaneously, the system controller 220 may start a cure timer on the real-time clock 246 to monitor the cure time during which the side plates 226A, 226B and SAM 240 are convectively heated. In parallel with the heat curing, the central system controller 220 may command the thermal conditioning subsystem 216 to activate or, if already activated, module the fluid-cooled conductive cooling platen 230 to cool one or more select stack surfaces of the cell stack 222 to thereby extract thermal energy from the battery cells 221. This is released and then the module is passed to the curing station.

During coordinated heating of the module housing and cooling of the battery cells, a PID control system may aggregate, process, and evaluate closed-loop cell temperature feedback data at multiple cell locations to actively modulate cell cooling. To this end, a PID thermal characterization analysis may be performed on each battery module preassembly with a networked array of temperature sensors 248 and other attendant instrumentation. This PID characterization may generate, in real-time, a heating/cooling curve that plots an average cell temperature across the battery cells 221 as a function of heat transfer to and from the cell stack 222. It may be desirable that the battery manufacturing system 200 employ between six and ten thermistors or thermocouples, with three to five sensing devices placed at multiple discrete locations on the top of the cell stack 222 and three to five sensing devices placed at multiple discrete locations on the bottom of the cell stack 222. Based on the temperature measurements taken at these locations, an average cell temperature across the cells 221 may be calculated from PID thermal characterization data.

Method 300 if FIG. 4 may provision precise activation and modulation of cold plate conditioning and, if desired, side plate convection to optimize the heat curing temperature without exceeding a threshold temperature limit. Using the cell temperature data provided by the temperature sensors 248 of FIG. 3, for example, the central system controller 220 may actively track real-time cell temperatures to determine if the cell stack temperature exceeds a threshold temperature limit (e.g., approximately 55° C.). Responsive to a determination that the cell stack temperature exceeds the threshold temperature limit, system controller 220 may temporarily pause heating of the module housing side plates 226A, 226B; however, cell conditioning and cooling of the cell stack 222 may be maintained and, if desired, actively adjusted using PID control to bring cell temperatures back within permissible range. Central system controller 220 may also pause the cure timer on the real-time clock 246 while convective heating is suspended.

System controller 220 may thereafter collect and analyze new cell temperature data from the temperature sensors 248 to actively monitor cell stack temperature after pausing the heating of the side plates 226A, 226B. Upon determining that the cell stack temperature has dropped below the threshold temperature limit, the central system controller 220 may responsively resume heating of the side plates 226A, 226B and SAM 240. Central system controller 220 may concurrently restart the cure timer on the real-time clock 246 when convective heating is resumed. The foregoing PID-controlled battery heating and conditioning steps may be repeated until a designated cure time is achieved. That is, system controller 220 may discontinue both the convective heating of the side plates 226A, 226B and SAM 240 and the convective cooling of the bottom-side surface of the compressed cell stack 222 responsive to determining that the monitored cure time equals or exceeds the predefined cure time.

After completing the heat-curing of the SAM, method 300 moves to COOLING BUFFER process block 311 unclamp, cool, and release the battery module preassembly for further processing. Central system controller 300 may command the heating buffer workstation 212 to disengage the convective heating elements 238A, 238B from the housing side plates 226A, 226B and concurrently disengage the cooling platen 230 from the battery cells 221. At the same time, the clamps of the handling fixture 236 may be disengaged and the WPC 224 with battery module 210 preassembly transferred to a cooling buffer station. The WPC 224 and battery module 210 preassembly may pass through a cooling tunnel in the cooling buffer station for pre-determined buffer time. After this final cooling stage, the WPC 224 and battery module 210 preassembly may be passed to one or more subsequent battery module assembly workstations on an assembly line to continue and complete processing of module per normal process, as indicated at CONTINUE PROCESSING process block 313.

Aspects of this disclosure may be implemented, in some embodiments, through a computer-executable program of instructions, such as program modules, generally referred to as software applications or application programs executed by any of a controller or the controller variations described herein. Software may include, in non-limiting examples, routines, programs, objects, components, and data structures that perform particular tasks or implement particular data types. The software may form an interface to allow a computer to react according to a source of input. The software may also cooperate with other code segments to initiate a variety of tasks in response to data received in conjunction with the source of the received data. The software may be stored on any of a variety of memory media, such as CD-ROM, magnetic disk, and semiconductor memory (e.g., various types of RAM or ROM).

Moreover, aspects of the present disclosure may be practiced with a variety of computer-system and computer-network configurations, including multiprocessor systems, microprocessor-based or programmable-consumer electronics, minicomputers, mainframe computers, and the like. In addition, aspects of the present disclosure may be practiced in distributed-computing environments where tasks are performed by resident and remote-processing devices that are linked through a communications network. In a distributed-computing environment, program modules may be located in both local and remote computer-storage media including memory storage devices. Aspects of the present disclosure may therefore be implemented in connection with various hardware, software, or a combination thereof, in a computer system or other processing system.

Any of the methods described herein may include machine readable instructions for execution by: (a) a processor, (b) a controller, and/or (c) any other suitable processing device. Any algorithm, software, control logic, protocol, or method disclosed herein may be embodied as software stored on a tangible medium such as, for example, a flash memory, a solid-state drive (SSD) memory, a hard-disk drive (HDD) memory, a CD-ROM, a digital versatile disk (DVD), or other memory devices. The entire algorithm, control logic, protocol, or method, and/or parts thereof, may alternatively be executed by a device other than a controller and/or embodied in firmware or dedicated hardware in an available manner (e.g., implemented by an application specific integrated circuit (ASIC), a programmable logic device (PLD), a field programmable logic device (FPLD), discrete logic, etc.). Further, although specific algorithms may be described with reference to flowcharts and/or workflow diagrams depicted herein, many other methods for implementing the example machine-readable instructions may alternatively be used.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. A method of assembling a battery module, the method comprising:

aligning a stack of battery cells with a reference datum on a workpiece carrier;

compressing a stack length of the stack of battery cells to a predefined stack length;

applying a heat-curable structural adhesive material (SAM) onto first and second side plates of a battery module housing of the battery module;

positioning the first and second side plates with the heat-curable SAM against first and second lateral sides, respectively, of the compressed stack of battery cells;

heating, using a conductive heating system, the first and second side plates of the battery module for a monitored cure time to thereby cure the SAM;

cooling, using a cell thermal conditioning system contemporaneous with the heating the first and second side plates, a select stack surface to thereby extract thermal energy from the compressed stack of battery cells; and discontinuing the heating of the first and second side plates and the cooling of the select stack surface of the compressed stack of battery cells responsive to a determination that the monitored cure time equals or exceeds a predefined cure time.

2. The method of claim 1, wherein the heating the first and second side plates includes:

placing first and second conductive heating elements of the conductive heating system against the first and second side plates, respectively, of the battery module; and activating the first and second conductive heating elements.

3. The method of claim 2, further comprising pressing first and second side-plate clamps against the first and second side plates, respectively, prior to activating the first and second conductive heating elements.

4. The method of claim 1, wherein cooling the select stack surface includes:

placing a cooling plate against a bottom side of the stack of battery cells; and circulating a cooling fluid across the cooling plate.

5. The method of claim 1, further comprising:

tracking, via a system controller, the monitored cure time during the heating of the first and second side plates; and determining, via the system controller, when the monitored cure time equals or exceeds the predefined cure time.

6. The method of claim 1, further comprising:

receiving, via a system controller from a plurality of temperature sensors thermally coupled to the compressed stack of battery cells, sensor signals indicative of a cell stack temperature during the heating of the first and second side plates; and pausing, via the system controller responsive to a determination that the cell stack temperature exceeds a threshold temperature limit, the heating of the first and second side plates and continuing the cooling of the select stack surface of the compressed stack of battery cells.

7. The method of claim 6, further comprising:

receiving, via the system controller from the plurality of temperature sensors after the pausing of the heating, new sensor signals indicative of a new cell stack temperature after pausing the heating of the first and second side plates; and resuming, via the system controller responsive to a determination that the new cell stack temperature is below the threshold temperature limit, the heating of the first and second side plates while continuing the cooling of the select stack surface.

8. The method of claim 6, wherein the heating the first and second side plates includes the system controller actively modulating a real-time thermal output of the conductive heating system based on the sensor signals received from the plurality of temperature sensors.

9. The method of claim 8, wherein the cooling the compressed stack of battery cells includes the system controller actively coordinating a real-time cooling output of the cell thermal conditioning system with the real-time thermal output of the conductive heating system.

10. The method of claim 1, wherein compressing the stack length of the stack of battery cells includes:
- positioning first and second end plates of the battery module housing on first and second longitudinal ends, respectively, of the stack of battery cells; and
- pressing, using an automated cell press station, the first end plate towards the second end plate.

11. The method of claim 10, further comprising, after compressing the stack length of the stack of battery cells and positioning the first and second side plates:
- welding first and second opposing longitudinal end segments of the first side plate to the first and second end plates, respectively; and
- welding respective opposing longitudinal end segments of the second side plate to the first and second end plates, respectively.

12. The method of claim 11, further comprising, prior to welding first and second side plates to the first and second end plates:
- pressing respective inboard faces of the first and second side plates of the battery module housing against the first and second lateral sides, respectively, of the compressed stack of battery cells; and
- pressing respective base flanges of the first and second side plates against a bottom side of the compressed stack of battery cells.

13. The method of claim 1, wherein the compressed stack of battery cells joined to the first and second side plates of the battery module housing by the cured SAM at least partially define a module preassembly, the method further comprising, after discontinuing the heating of the first and second side plates and the cooling of the compressed stack of battery cells:
- transferring the module preassembly to a cooling buffer station; and
- chilling the module preassembly in the cooling buffer station for a predefined chill time.

14. A non-transient, computer-readable medium storing instructions executable by one or more system controllers of a manufacturing system for assembling a battery module, the battery module including a stack of battery cells and a battery module housing, the instructions, when executed, causing the one or more system controllers to perform operations comprising:
- commanding an automated cell press station to align the stack of battery cells with a reference datum on a workpiece carrier;
- commanding the automated cell press station to compress a stack length of the stack of battery cells to a predefined stack length to create a compressed stack of battery cells;
- commanding an automated adhesive injection machine to inject a heat-curable structural adhesive material (SAM) onto inboard surfaces of first and second side plates of a battery module housing of the battery module;
- commanding an automated side-plate positioning robot to position the first and second side plates with the heat-curable SAM against outboard surfaces of first and second lateral sides, respectively, of the compressed stack of battery cells;
- commanding a conductive heating system to heat the first and second side plates of the battery module for a monitored cure time to thereby cure the heat-curable SAM;
- commanding a cell thermal conditioning system to cool a bottom stack surface of the compressed stack of battery cells to thereby extract thermal energy from the battery cells contemporaneous with the heating the first and second side plates; and
- commanding the conductive heating system to discontinue the heating of the first and second side plates and the cell thermal conditioning system to discontinue the cooling of the bottom stack surface of the compressed stack of battery cells responsive to a determination that the monitored cure time equals or exceeds a predefined cure time.

15. A manufacturing system for assembling a battery module with a stack of battery cells and a battery module housing, the manufacturing system comprising:
- an automated cell press station;
- an automated side-plate positioning robot;
- an automated adhesive injection machine;
- a conductive heating system;
- a cell thermal conditioning system; and
- a system controller programmed to:
  - command the automated cell press station to align the stack of battery cells with a reference datum on a workpiece carrier;
  - command the automated cell press station to compress a stack length of the stack of battery cells to a predefined stack length;
  - command the automated adhesive injection machine to apply a heat-curable structural adhesive material (SAM) onto first and second side plates of a battery module housing of the battery module;
  - command the automated side-plate positioning robot to position the first and second side plates with the heat-curable SAM against first and second lateral sides, respectively, of the compressed stack of battery cells;
  - command the conductive heating system to heat the first and second side plates of the battery module for a monitored cure time to thereby cure the heat-curable SAM;
  - command the cell thermal conditioning system to cool a select stack surface of the compressed stack of battery cells to thereby extract thermal energy from the battery cells contemporaneous with heating the first and second side plates; and
  - command the conductive heating system to discontinue the heating of the first and second side plates and the cell thermal conditioning system to discontinue the cooling of the select stack surface of the compressed stack of battery cells responsive to a determination that the monitored cure time equals or exceeds a predefined cure time.

16. The manufacturing system of claim 15, wherein heating the first and second side plates includes:
- placing first and second conductive heating elements of the conductive heating system against the first and second side plates, respectively, of the battery module; and
- activating the first and second conductive heating elements.

17. The manufacturing system of claim 15, wherein cooling the select stack surface includes:

placing a cooling plate against a bottom side of the stack of battery cells; and circulating a cooling fluid across the cooling plate.

18. The manufacturing system of claim 15, further comprising a plurality of temperature sensors thermally coupled to the compressed stack of battery cells, wherein the system controller is further programmed to:

receive, from the temperature sensors, sensor signals indicative of a cell stack temperature during the heating of the first and second side plates; and responsive to a determination that the cell stack temperature exceeds a threshold temperature limit, pause the heating of the first and second side plates while continuing the cooling of the select stack surface of the compressed stack of battery cells.

19. The manufacturing system of claim 18, wherein heating the first and second side plates includes the system controller actively modulating a real-time thermal output of the conductive heating system based on the sensor signals received from the plurality of temperature sensors.

20. The manufacturing system of claim 19, wherein cooling the select stack surface of the compressed stack of battery cells includes the system controller actively coordinating a real-time cooling output of the cell thermal conditioning system with the real-time thermal output of the conductive heating system.

* * * * *